US010007274B2

(12) United States Patent
Shimamura et al.

(10) Patent No.: US 10,007,274 B2
(45) Date of Patent: Jun. 26, 2018

(54) WATER PUMP CONTROL APPARATUS (71) Applicant: HONDA MOTOR CO., LTD., Tokyo (JP)

(72) Inventors: Hideaki Shimamura, Wako (JP); Atsuhisa Ishikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 330 days.

(21) Appl. No.: 14/669,402

(22) Filed: Mar. 26, 2015

(65) Prior Publication Data
US 2015/0277448 A1    Oct. 1, 2015

(30) Foreign Application Priority Data

Mar. 28, 2014    (JP) .................. 2014-067788

(51) Int. Cl.
*G05D 9/12* (2006.01)
*F04D 15/00* (2006.01)
*F04D 15/02* (2006.01)
*F04D 29/42* (2006.01)

(52) U.S. Cl.
CPC ........... *G05D 9/12* (2013.01); *F04D 15/0066* (2013.01); *F04D 15/0218* (2013.01); *F04D 29/426* (2013.01); *Y10T 137/73* (2015.04); *Y10T 137/7303* (2015.04)

(58) Field of Classification Search
CPC ............. F04D 15/0218; F04D 15/0066; F04D 29/426; G05D 9/12; Y10T 137/73; Y10T 137/7302; G01N 33/0011; A01G 27/03
USPC .......................................................... 417/36
See application file for complete search history.

(56) References Cited

U.S. PATENT DOCUMENTS

| 5,357,781 | A | * | 10/1994 | Tikijian | ............. | G01N 33/0011 340/632 |
| 5,667,362 | A | * | 9/1997 | Murai | ................. | F04D 15/0066 417/41 |
| 6,471,476 | B1 | * | 10/2002 | Diels | ...................... | F04D 29/426 416/1 |
| 6,568,425 | B2 | * | 5/2003 | Gergek | ................. | A01G 27/003 137/561 A |
| 2008/0202586 | A1 | * | 8/2008 | Togare | ................ | F04D 15/0218 137/1 |

(Continued)

FOREIGN PATENT DOCUMENTS

JP    2005-100758    4/2005

*Primary Examiner* — Devon Kramer
*Assistant Examiner* — Connor Tremarche
(74) *Attorney, Agent, or Firm* — Rankin, Hill & Clark LLP (57) ABSTRACT

An apparatus for controlling a water pump having an engine that drives an impeller, a water storage tank connected to the water pump, a first water level detector that outputs an A signal when a water level is at or higher than a first height and outputs a B signal when lower than the height, a second water level detector that outputs the A signal when the water level is at or lower than a second height and outputs the B signal when higher than the height, a connection switcher that switches connection of the first and second water level detector, and an impeller controller connected to the connection switcher and adapted to control operation of the engine that drives the impeller of the water pump based on the signals outputted from the first and second water level detectors.

7 Claims, 8 Drawing Sheets (56) References Cited

U.S. PATENT DOCUMENTS

2013/0279724 A1* 10/2013 Stafford .............. H04R 1/1041
381/309
2014/0059759 A1* 3/2014 DuHack ................ A61H 33/60
4/494

* cited by examiner

WATER PUMP CONTROL APPARATUS

BACKGROUND

Technical Field

This invention relates to a water pump control apparatus.

Background Art

For use with water storage tanks equipped with an internal float switch for detecting water level and a water pump for discharging water from the water storage tank, there have been developed various types of water pump control apparatuses for starting and stopping the water pump based on the water level detected by the float switch. The apparatus found in Japanese Laid-Open Patent Application No. 2005-100758 can be cited as an example.

The apparatus taught by Japanese Laid-Open Patent Application No. 2005-100758 has a high water level detection float switch and a low water level detection float switch installed in a water storage tank, and is responsive to the output signals of these float switches to start the water pump and discharge water from the water storage tank when the water in the water storage tank is determined to be at high level and, on the other hand, to stop the water pump and terminate water discharge when the water is determined to be at low level.

SUMMARY

In some emerging nations regions, river water or pond water, for example, is used as drinking and household water. The river, pond or other water used as drinking or general household water is pumped up and stored in a water storage tank, but the stored water is drained out and replaced with new water when it becomes too old to use after a certain length of time.

Although a water pump is used when water is stored in an ordinary water storage tank in the foregoing manner, the water is usually discharged from the water storage tank through a drain hole or the like of the water storage tank without using a water pump. However, use of a water pump is desired for quick water discharge, and there is a further desire to be able to discharge and supply water with a single motor automatically (automatic starting/stopping).

However, Japanese Laid-Open Patent Application No. 2005-100758 enables only discharge of water from the water storage tank to be performed automatically and offers no suggestion about supplying water to the water storage tank.

Attempts to perform both discharge and supply of storage tank water automatically with a control program based on signals or the like from float switches have been hindered by, inter alia, the need to increase the number of float switches to be greater than in the case of performing only one or the other of water discharge and water supply and the need for a complicated control program to implement both discharge and supply.

Therefore, an object of this invention is to overcome the aforesaid problem by providing a water pump control apparatus capable of discharging water from and supplying water to a water storage tank, with a simple structure and simple control program.

In order to achieve the object, this invention provides an apparatus (10) for controlling a water pump (14) having an engine (16) that drives an impeller (72), a water intake port (26) and delivery port (28), a water storage tank (12) and a hose (30, 32) connected to the water intake port or the delivery port, the water pump being adapted to discharge water sucked through the water intake port from the delivery port when the impeller is driven by the engine, and to discharge water from or supply water to the water storage tank when connection of the hose switched between the intake port and delivery port by an operator, comprising: a first water level detector (18) installed at an upper first height inside the water storage tank that outputs an A signal when a level of water in the water storage tank is at or higher than the first height and outputs a B signal when the level of the water in the water storage tank is lower than the first height; a second water level detector (20) installed at a lower second height inside the water storage tank that outputs the A signal when the level of the water in the water storage tank is at or lower than the second height and outputs the B signal when the level of the water in the water storage tank is higher than the second height; a connection switcher (24) switchably connected to the first and second water level detector to be operable by the operator that switches connection of the first and second water level detector when operated by the operator; and an impeller controller (22) connected to the connection switcher and adapted to control operation of the engine that drives the impeller of the water pump based on the signals outputted from the first and second water level detectors.

BRIEF DESCRIPTION OF THE DRAWINGS

The above and other objects and advantages of an embodiment of this invention will be more apparent from the following description and drawings in which.

DESCRIPTION OF EMBODIMENT

An embodiment for implementing the water pump control apparatus according to this invention is explained with reference to the attached drawings in the following.

Figure 1:
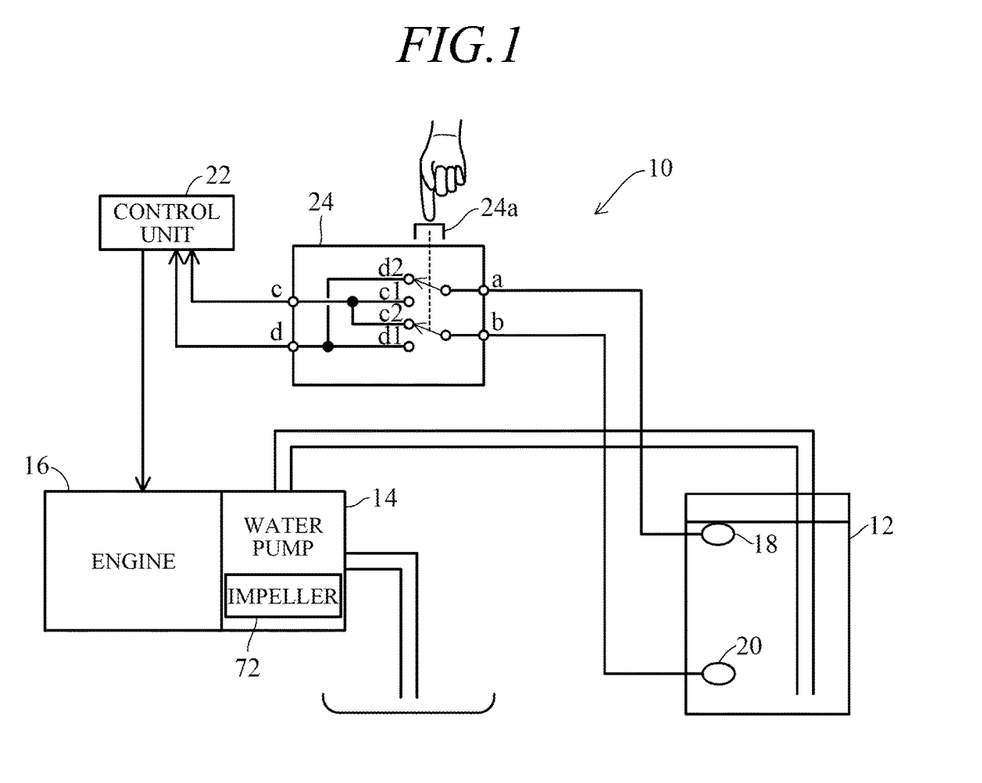
FIG. 1 is a block diagram overview of a water pump control apparatus according to an embodiment of this invention.
Figure 2:
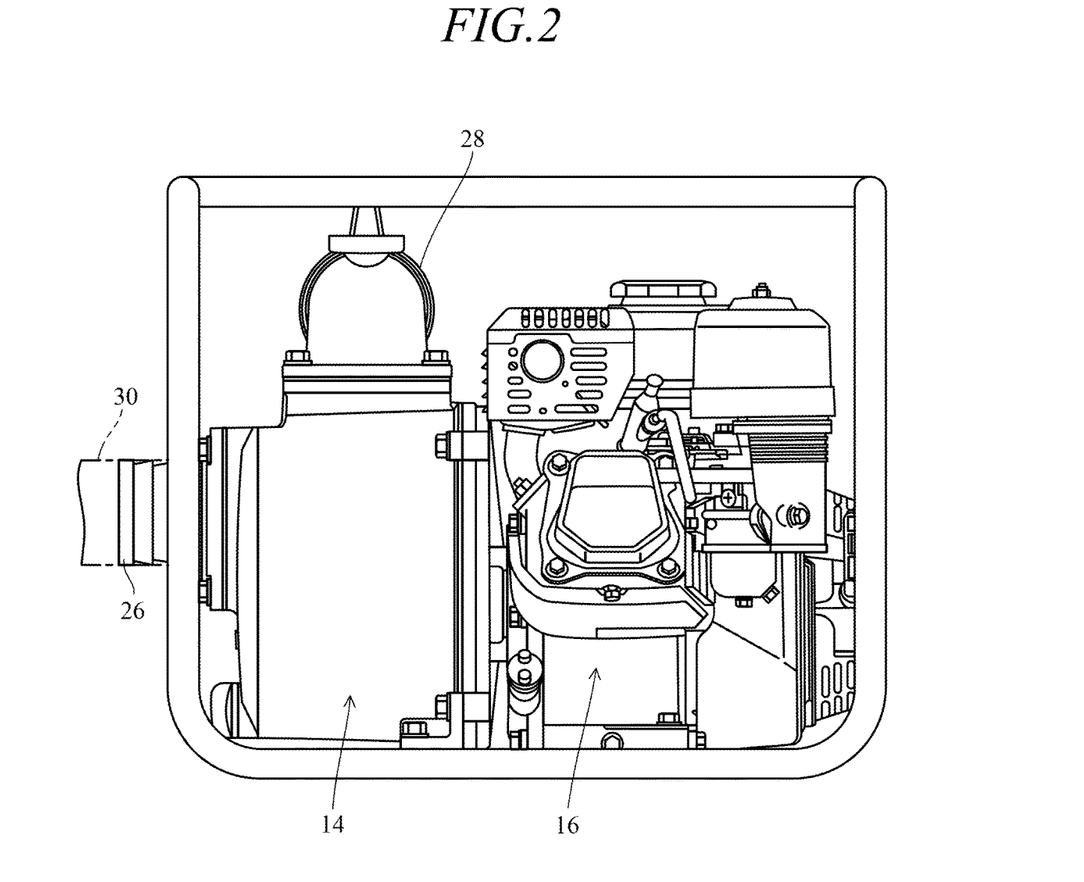
FIG. 2 is a front view of a water pump and an engine for driving the water pump shown in FIG. 1.

FIG. 1 is a block diagram overview of a water pump control apparatus according to an embodiment of this invention; FIG. 2 is a front view of a water pump and an engine for driving the water pump shown in FIG. 1; and FIG. 3 is a plan view of the water pump and engine shown in FIG. 2.

Symbol 10 in FIG. 1 designates a water pump control apparatus. The water pump control apparatus 10 comprises a water pump 14 capable of supplying and discharging water to and from a water storage tank 12, an engine 16 for driving the water pump 14, first and second float switches (first and second water level detector) 18 and 20 for detecting a level of water in the water storage tank 12, and a control unit (impeller controller) 22 for controlling operation of the engine 16 to start and stop the water pump 14. Further, a toggle switch (connection switcher) 24 is provided on the signal lines connecting the first and second float switches 18 and 20 with the control unit 22 to enable switching for reversing connections between the first and second float switches 18 and 20 and the control unit 22.

Figure 3:
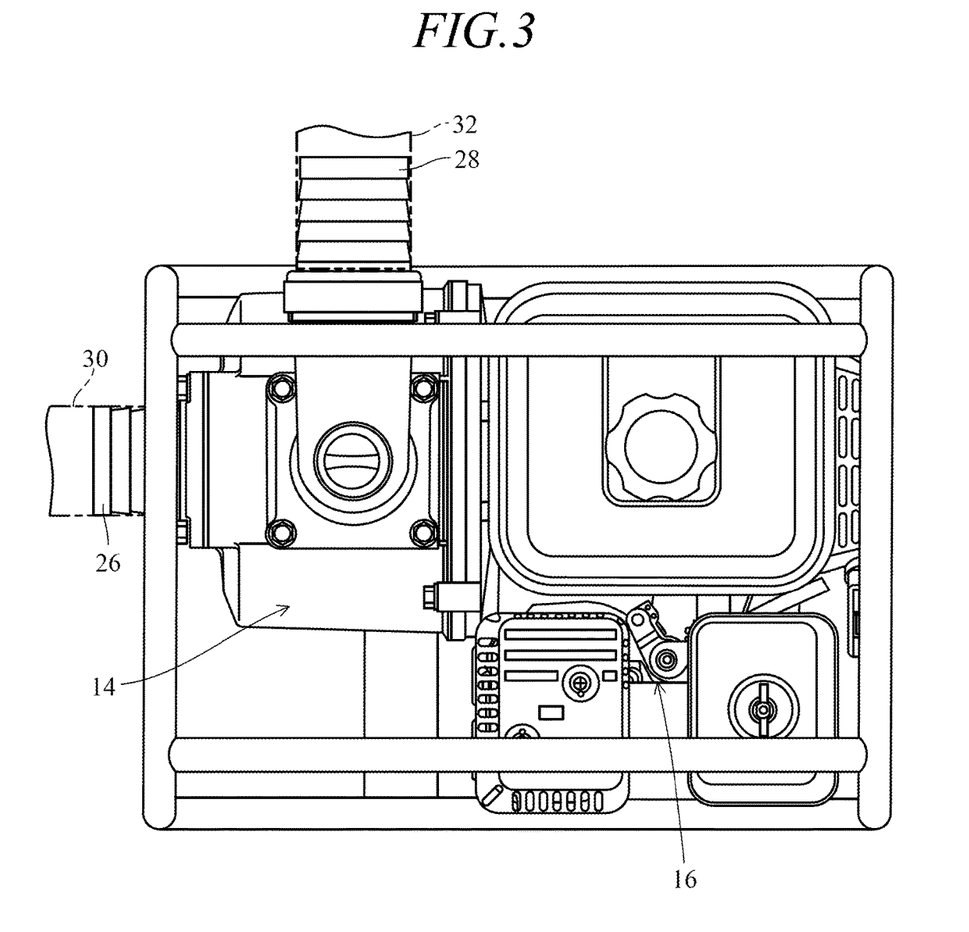
FIG. 3 is a plan view of the water pump and engine shown in FIG. 2.

The water pump 14 is a centrifugal pump and, as shown FIGS. 2 and 3, is equipped with an inlet pipe 26 serving as a water intake port and an outlet pipe 28 serving as a delivery port. The inlet pipe 26 is connected through an intake hose 30 to a water supply source, and the outlet pipe 28 is connected through a delivery hose 32 to a water supply destination.

Figure 4:
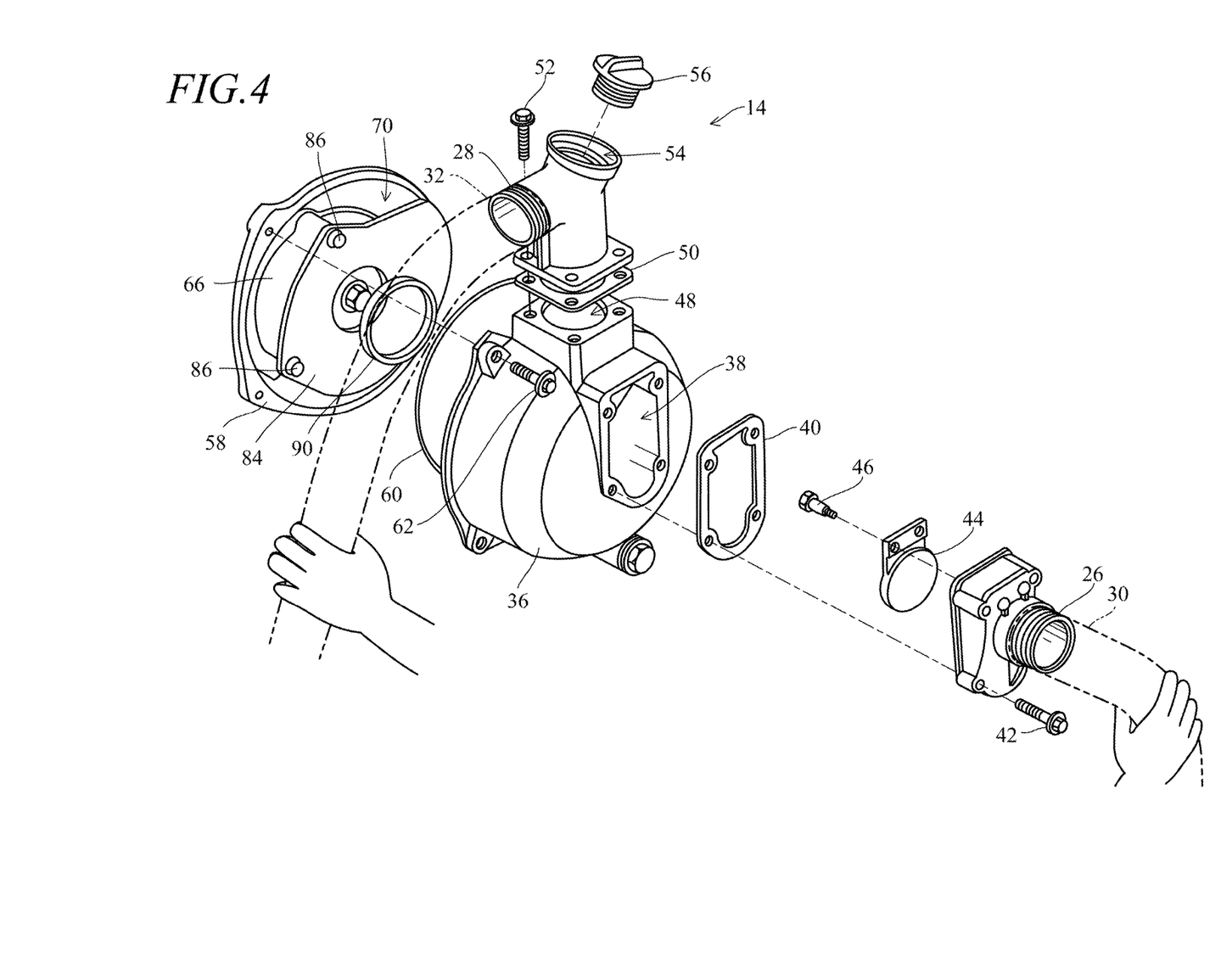
FIG. 4 is an exploded perspective view of the water pump shown in FIG. 2.
Figure 5:
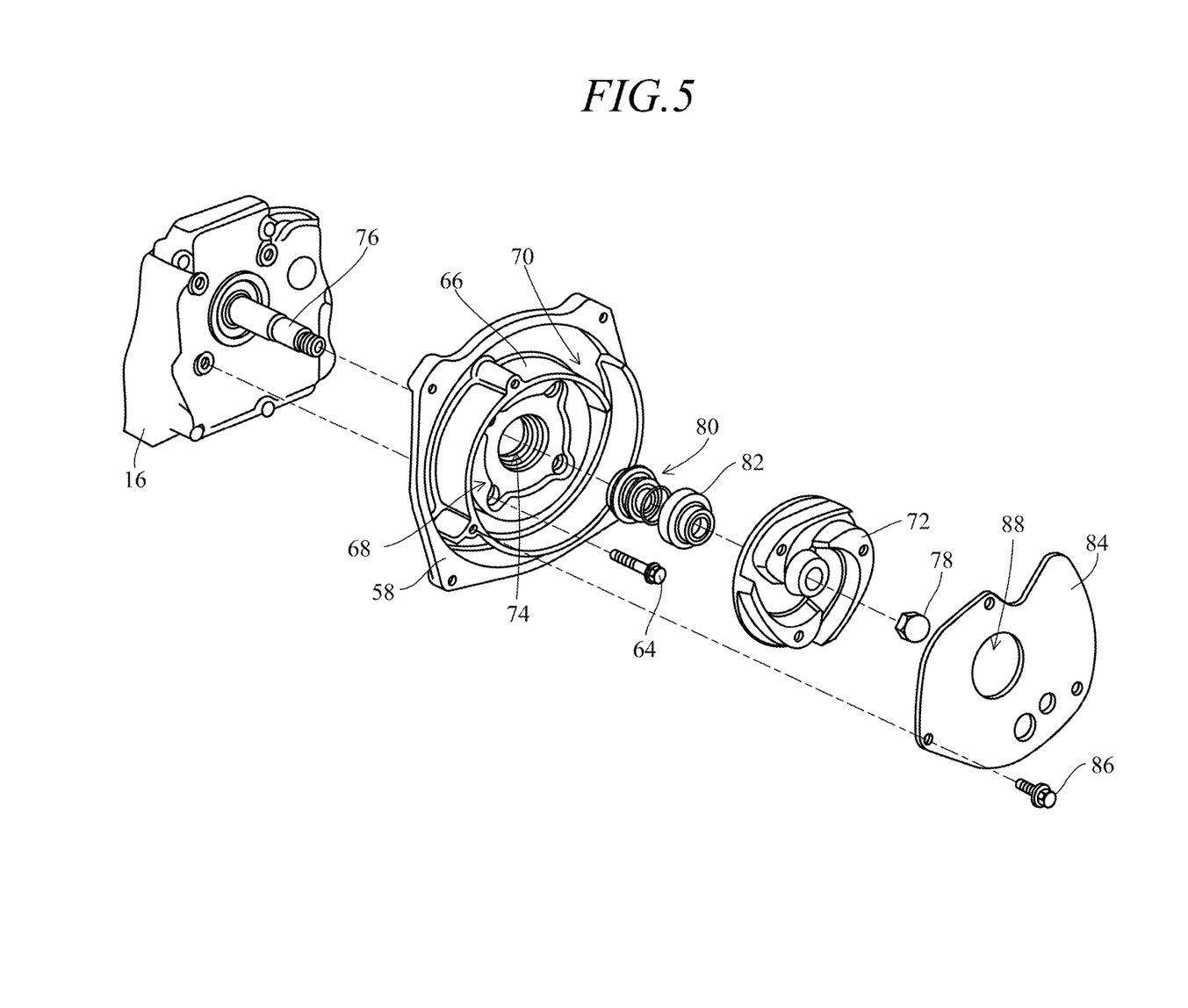
FIG. 5 is an exploded perspective view of a casing cover shown in FIG. 4.

Now follows a concrete explanation of the structure of the water pump 14. FIG. 4 is an exploded perspective view of the water pump 14, and FIG. 5 is an exploded perspective view of a casing cover.

As shown in FIG. 4, the water pump 14 is equipped with a casing 36. One side face of the casing 36 has an opening 38, and the inlet pipe 26 is fastened to the opening 38 via an interposed packing 40 using a number of bolts 42 (only one shown in the drawing). An inlet valve 44 is attached to the inlet pipe 26 using a number of bolts 46 (only one shown in the drawing).

A top face of the casing 36 has an opening 48, and the outlet pipe 28 is fastened to the opening 48 via an interposed packing 50 using a number of bolts 52 (only one shown in the drawing). The outlet pipe 28 is formed at a suitable location with an opening 54. The opening 54 is a filler hole for pouring in priming water required when the water pump 14 is started. The operator closes it with a detachable filler cap 56.

A casing cover 58 is attached to the face of the casing 36 on the side opposite from the opening 38 via an interposed seal ring 60 using a number of bolts 62 (only one shown in the drawing). As shown in FIG. 5, the casing cover 58 is attached to the engine 16 using a number of bolts 64 (only one shown in the drawing). The face of the casing cover 58 opposing the casing 36 (not shown in FIG. 5) is formed with a volute casing 68 by a spirally projecting wall 66. The volute casing 68 is formed with a passage that progressively increases in sectional area counterclockwise in the plane of the drawing sheet until reaching an exhaust port 70 formed at the top.

An impeller 72 is accommodated in the volute casing 68. A through-hole 74 is formed in the casing cover 58, and a crankshaft 76 of the engine 16 is inserted through the through-hole 74 into the volute casing 68. The impeller 72 is fastened to the crankshaft 76 passed through the volute casing 68 using a nut 78. The rotation direction of the crankshaft 76 and impeller 72 is counterclockwise in the plane of the drawing sheet. A mechanical seal 80 and a seal collar 82 to be attached to the outer periphery of the crankshaft 76 are fitted in the through-hole 74.

A friction disk 84 is attached to the wall 66 using a number of bolts 86 (only one shown in FIG. 5, only two in FIG. 4), thereby sealing the volute casing 68. A through-hole 88 formed in the friction disk 84 is communicated with the opening 38 formed in the casing 36 via an interposed seal ring 90 (shown in FIG. 4).

An explanation of the flow of water sucked into the water pump 14 follows. When the operator starts the engine 16 after pouring priming water in through the opening 54, the impeller 72 is rotated by the crankshaft 76. Suction generated by the rotation of the impeller 72 draws up water to fill the intake hose 30, whereafter water drawn in through the inlet pipe 26 passes through the opening 38 of the casing 36 and the through-hole 88 of the friction disk 84 and flows into the volute casing 68.

The water fed into the volute casing 68 is pumped to the exhaust port 70 by the rotation of the impeller 72 and then passes through the opening 48 of the casing 36 to be discharged from the outlet pipe 28 into the delivery hose 32.

When the water pump 14 is started and the impeller 72 rotated with the intake hose 30 connected to the water storage tank 12 and the delivery hose 32 connected with (extending to) an outside river, pond or the like, water in the water storage tank 12 is sucked into the water pump 14 through the intake hose 30 and the sucked in water is discharged into the outside river or pond through the delivery hose 32 (i.e., water in the water storage tank 12 is discharged to the outside). From this state, if, for example, the operator switches the connection destinations of the intake hose 30 and the delivery hose 32, water can be supplied to the water storage tank 12.

In other words, when the operator connects the intake hose 30 to the river or pond and the delivery hose 32 to the water storage tank 12 and then starts the water pump 14, oppositely from the foregoing, river or pond water is sucked into the water pump 14 through the intake hose 30 and the sucked in water is discharged into the water storage tank 12 through the delivery hose 32 (i.e., water is supplied to the water storage tank 12).

Thus, by switching the connection destinations of the intake hose 30 and delivery hose 32 (or by switching the pump-side connection destinations of the hoses connected to the water storage tank 12 and to the river or pond between the inlet pipe 26 and the outlet pipe 28), both discharge of water from the water storage tank 12 and supply water to the water storage tank 12 becomes possible with a single water pump 14.

Figure 6:
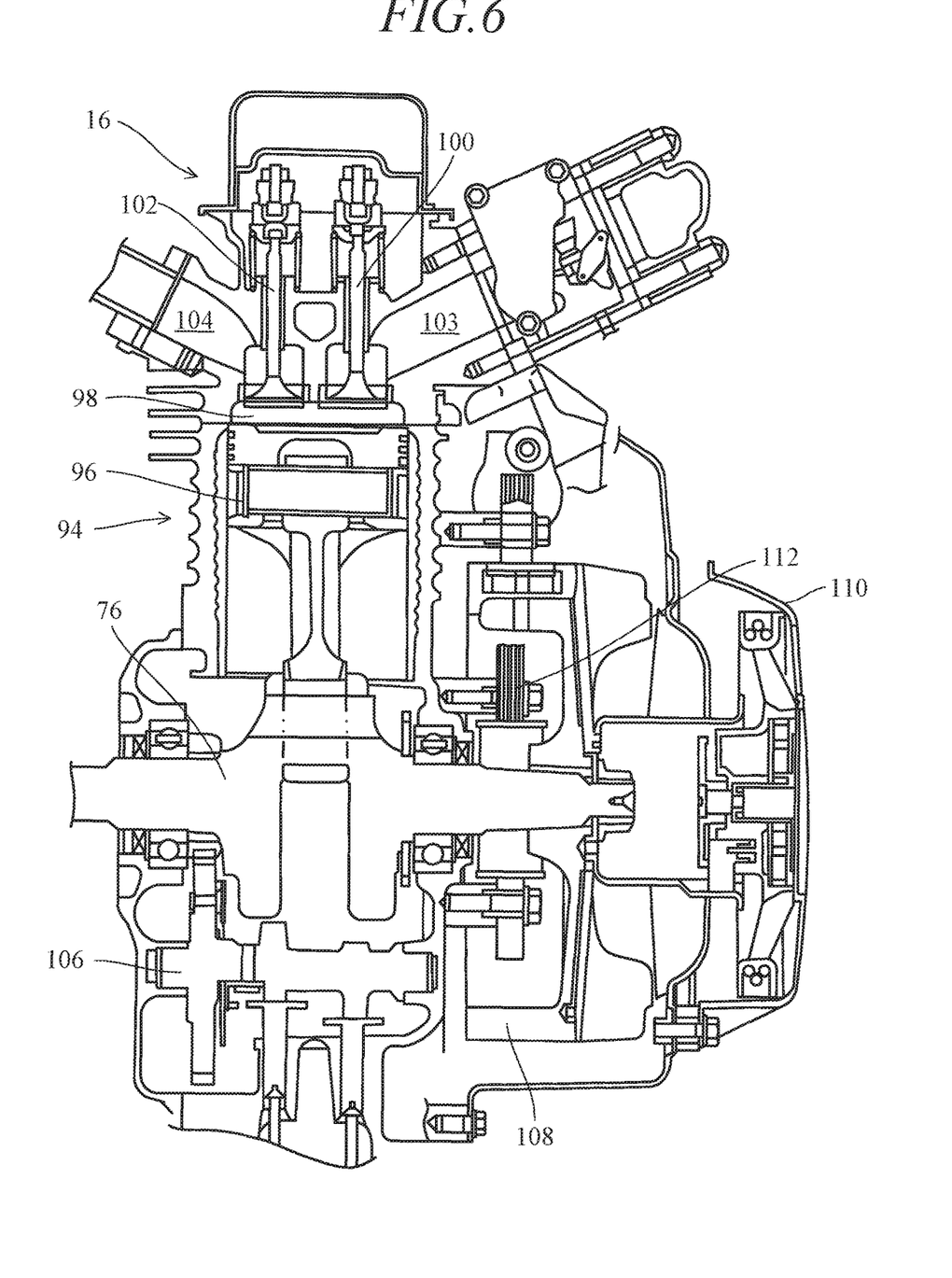
FIG. 6 is a sectional view of the engine shown in FIG. 2.

FIG. 6 is a sectional view of the engine 16.

The engine 16 has a single cylinder 94 in which a piston 96 is reciprocatingly accommodated. An intake valve 100 and an exhaust valve 102 installed at positions facing a combustion chamber 98 of the engine 16 operate to open and shut off communication of the chamber 98 with an intake pipe 103 and an exhaust pipe 104. To be more specific, the engine 16 is a water-cooled, four-cycle, single-cylinder, OHV internal combustion engine with a displacement of 163 cc.

The piston 96 is connected to the crankshaft 76, which is connected through a gear to a camshaft 106. A flywheel 108 is attached to one end of the crankshaft 76 and a recoil starter 110 is attached to the outer side of the flywheel 108. As mentioned above, the impeller 72 of the water pump 14 is attached to the other end of the crankshaft 76.

A generator coil (alternator) 112 installed on the inside of the flywheel 108 generates alternating current. The alternating current generated by the generator coil 112 is converted to direct current by a processing circuit (not shown) and then supplied to an ignition circuit (not shown) etc. as operating power.

Resuming the explanation of FIG. 1, the first and second float switches 18 and 20 are both installed on the inner side surface of the water storage tank 12 and are constituted as float-switch type level sensors whose floats move up and down (rise and sink) in accordance with the water level in the water storage tank 12.

Figure 7A:
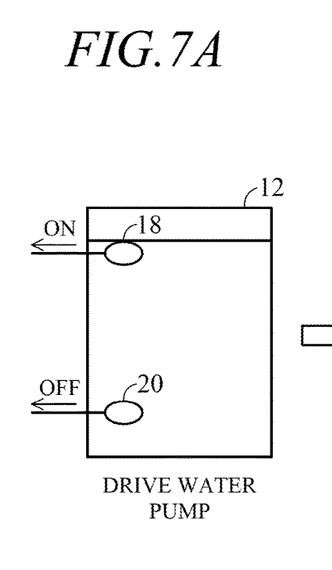
FIGS. 7A-7C are a set of explanatory diagrams for explaining the operation of the first and second float switches 18 and 20 when water is discharged from the water storage tank 12 shown in FIG. 2.
Figure 7B:
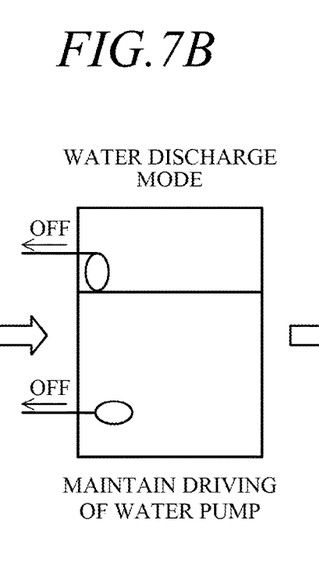
Figure 7C:
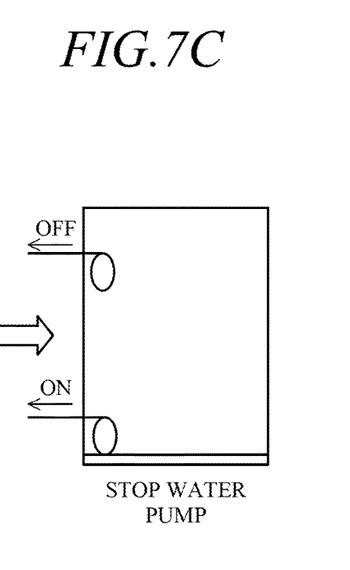
Figure 8A:
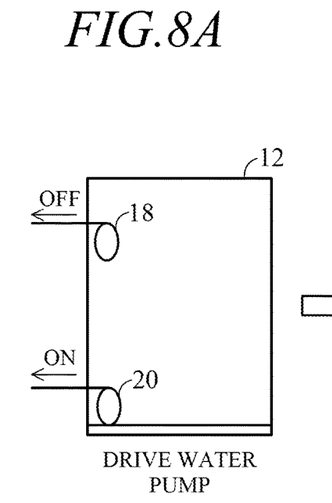
FIGS. 8A-8C are a set of explanatory drawings for explaining the operation of the first and second float switches when water is supplied to the water storage tank shown in FIG. 1.
Figure 8B:
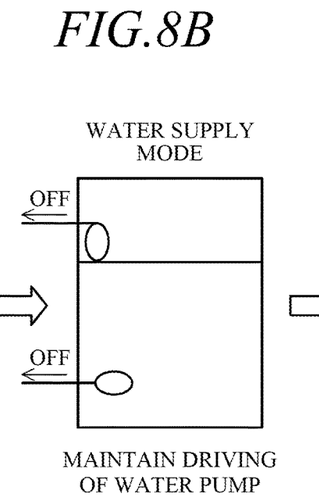
Figure 8C:
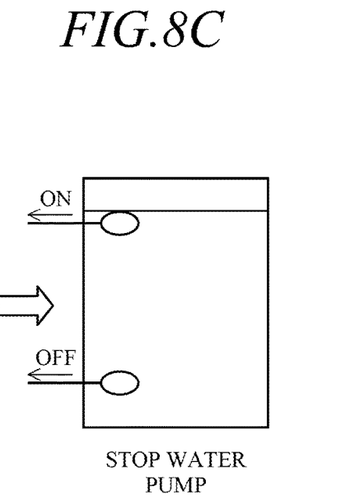

FIGS. 7A-7C are a set of explanatory diagrams for explaining the operation of the first and second float switches 18 and 20 when water is discharged from the water storage tank 12, and FIGS. 8A-8C are a set of explanatory drawings for explaining the operation of the first and second float switches 18 and 20 when water is supplied to the water storage tank 12.

As shown in FIGS. 7A-8C, the first float switch 18 is located at an upper position (upper side) in the gravity direction of the interior of the water storage tank 12, specifically, as shown in FIG. 7A and FIG. 8C, at a position corresponding to an upper limit of the water level in the water storage tank 12 (more exactly, at a full level of the water storage tank 12 or an upper limit position of the water level designated by the operator or an assistant; hereinafter called "first level").

On the other hand, the second float switch 20 is located at a lower position (lower side) in the gravity direction of the interior of the water storage tank 12, specifically, as shown in FIG. 7C and FIG. 8A, at a position corresponding to a lower limit of the water level in the water storage tank 12 (more exactly, at an empty or near empty level of the water storage tank 12 or a lower limit position of the water level designated by the operator or an assistant; hereinafter called "second level").

Therefore, a configuration is adopted whereby the first float switch 18 outputs an ON signal (the A signal) when the water level in the water storage tank 12 is at or above the first level (the upper limit) and outputs an OFF signal (the B signal) when the water level is below the first level. And a configuration is further adopted whereby the second float switch 20 outputs an ON signal when the water level in the water storage tank 12 is at or below the second level (the lower limit) and outputs an OFF signal when the water level is above the second level.

Resuming the explanation of FIG. 1, the control unit 22 is constituted as a microcomputer comprising a CPU, ROM and RAM, among other components, and controls the engine 16 etc. The signals from the first and second float switches 18 and 20 are input to the control unit 22.

The toggle switch 24 comprises an input terminal a that is connected to the first float switch 18 and receives the signals outputted from the first float switch 18 as input, an input terminal b that is connected to the second float switch 20 and receives the signals outputted from the second float switch 20 as input, two output terminals c and d connected to the control unit 22, and a switch (lever, button or similar) 24a provided to be operable by the operator.

The toggle switch 24 is configured to switch (interchange) the input terminals a and b between their connection destinations (output terminals c and d) upon operation of the switch 24a by the operator. Specifically, the configuration is such that each operation of the switch 24a switches the connection destination of the input terminal a to an output terminal c1 or d2, and the connection destination of the input terminal b to an output terminal d1 or c2. Therefore, by using the switch 24a, the signal input to the input terminal a from the first float switch 18 can be output to the output terminal c without switching or be switched and output to the output terminal d. Similarly, the signal input to the input terminal b from the second float switch 20 can be output to the output terminal d without switching or be switched and output to the output terminal c. Thus, such operation of the switch 24a makes it possible to switch the polarities of the signals outputted from the first and second float switches 18 and 20 (from ON signal to OFF signal or from OFF signal to ON signal) and output them to the control unit 22.

Figure 9:
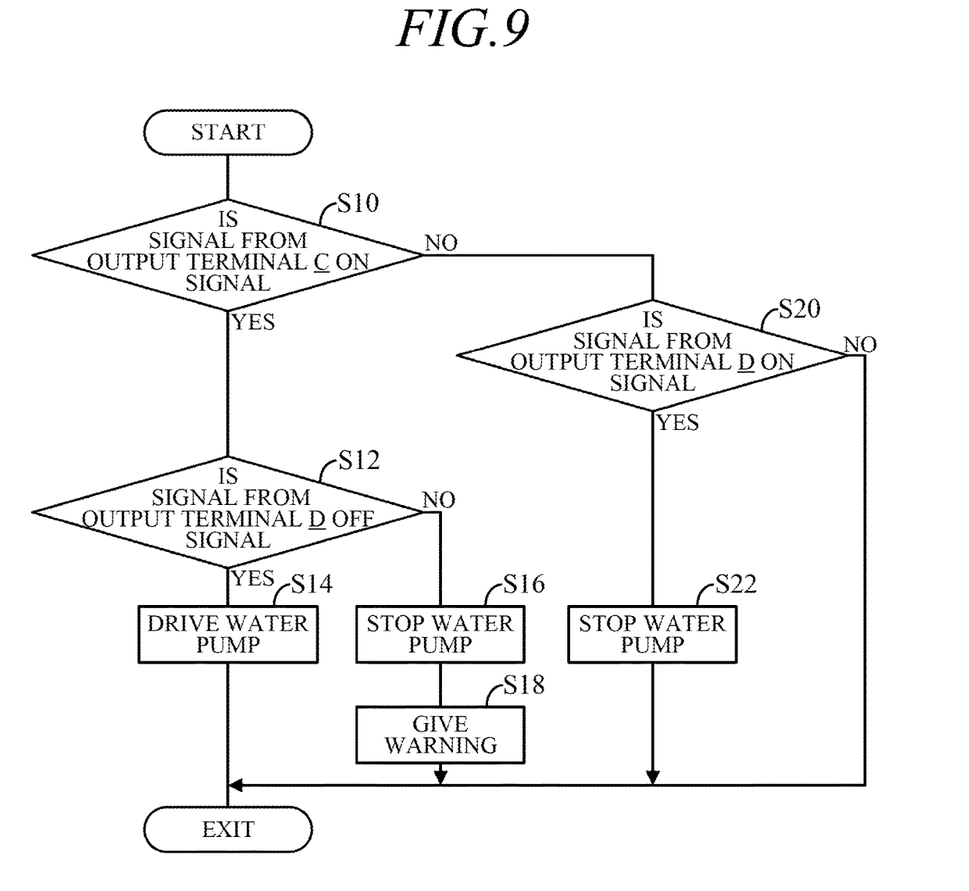
FIG. 9 is a flowchart showing the operation of the water pump shown in FIG. 1.

The operation of the water pump 14 will be explained next. FIG. 9 is a flowchart showing the operation of the water pump 14. The illustrated program is executed at predetermined time intervals.

First, in S (processing step) 10, it is checked whether the signal from the output terminal c of the toggle switch 24 is an ON signal. When the result is YES, the program goes to S12, in which it is checked whether the signal from the output terminal d is an OFF signal.

When the result in S12 is YES, the program goes to S14, in which the engine 16 is started to start the water pump 14 (rotate the impeller 72). The engine 16 is started by rotating a starter motor using power from a battery or the like.

When the result in S12 is NO, i.e., when the signals outputted from the output terminal c and the output terminal d are both ON signals, the program goes to S16, in which the engine 16 is stopped to stop the water pump 14 (stop rotation of the impeller 72), and to S18, in which a warning is given to the operator. The reason for stopping water pump 14 and warning the operator is that the fact that the signals from the output terminal c and the output terminal d are both ON signals suggests that some abnormality has occurred in, for example, the first float switch 18 and/or the second float switch 20. The warning can be issued in any of various ways, such as by lighting a lamp, sounding an alarm or displaying an error message, without limitation to any particular method.

When the result in S10 is NO, i.e., when the signal from the output terminal c is an OFF signal, the program goes to S20, in which it is checked whether the signal from the output terminal d is an ON signal. When the result in S20 is YES, the program goes to S22, in which the water pump 14 is stopped, and when it is NO, processing is terminated.

As described in the foregoing, the signals from the output terminal c and the output terminal d are monitored, and starting and stopping of the water pump 14 is controlled based solely on these signals, irrespective of how the toggle switch 24 is switched.

Resuming the explanation of FIGS. 7A-8C, in the case of discharging water from the water storage tank 12 (hereinafter termed "water discharge mode"), when the water level in the water storage tank 12 is at or above the first level as shown in FIG. 7A, i.e., when an ON signal is outputted from the first float switch 18 and an OFF signal is outputted from the second float switch 20, the water pump 14 is started to start water discharge. Then, after passing through the state of FIG. 7B, when, as shown in FIG. 7C, the water level in the water storage tank 12 falls to or below the second level, i.e., when an OFF signal is outputted from the first float switch 18 and ON signal is outputted from the second float switch 20, the water pump 14 is stopped to terminate water discharge.

On the other hand, in the case of supplying water to the water storage tank 12 (hereinafter termed "water supply mode"), when the water level in the water storage tank 12 is at or below the second level as shown in FIG. 8A, i.e., when an OFF signal is outputted from the first float switch 18 and an ON signal is outputted from the second float switch 20, the water pump 14 is started to start water supply. Then, after passing through the state of FIG. 8B, when, as shown in FIG. 8C, the water level in the water storage tank 12 rises to or above the first level, i.e., when an ON signal is outputted from the first float switch 18 and OFF signal is outputted from the second float switch 20, the water pump 14 is stopped to terminate water supply.

Thus, the signals outputted from the first and second float switches at the times of starting and stopping the water pump 14 differ between the water discharge mode and the water supply mode (see FIGS. 7A, 7C and FIGS. 8A, 8C). Therefore, when the control unit 22 is to perform both water discharge and water supply with a control program based on the signals from the first and second float switches 18 and 20, it must first determine which mode is to be implemented, the water discharge mode or the water supply mode, and execute processing according to the determined mode.

However, the present invention provides the toggle switch 24 on the signal lines that connect the first and second float switches 18 and 20 to the control unit 22 in a configuration that enables switching (reversal) of the connections between the first and second float switches 18 and 20 and the control unit 22, so that water can be discharged from and supplied to the water storage tank 12 with a simple program like that shown in FIG. 9 which only controls starting and stopping of the water pump 14 based solely on the signals from the output terminals c and d.

That is, as described in the foregoing, the signals outputted from the first and second float switches 18 and 20 at the time the water pump 14 is started and stopped differ between the water discharge mode and the water supply mode. However, in the water discharge mode, for example, the toggle switch 24 is used to maintain the connections between the input terminals a, b and the output terminals c, d without reversal (in a state with the input terminal a connected to the output terminal c, and the input terminal b connected to the output terminal d), while in the water supply mode, it is used to reverse the connections between the input terminals a, b and the output terminals c, d (to a state with the input terminal a connected to the output terminal d, and the input terminal b connected to the output terminal c).

The result of doing this is that, irrespective of whether discharge mode or supply mode, the signals received by the control unit 22 are always an ON signal from the output terminal c and always an OFF signal from the output terminal d when the water pump 14 is to be started, and, on the other hand, always an OFF signal from the output terminal c and always an ON signal from the output terminal d when the water pump 14 is to be stopped. Therefore, the control unit 22 can control stopping and starting of the water pump 14 based solely on the signals from the output terminals c and d, without checking whether the mode is water discharge or water supply.

In other words, irrespective of how the mode is switched, whether to water discharge mode or to water supply mode, the signals to be input to the control unit 22 for starting or stopping the water pump 14 can be kept the same by switching the toggle switch 24. Therefore, it suffices for the control unit 22 always to execute the same control program irrespective of mode, and it suffices for it only to control starting and stopping of the water pump 14 based solely on the signals from the output terminals c and d, regardless of whether in water discharge mode or in water supply mode, i.e., without making any determination whatsoever regarding whether the mode is water discharge or water supply. Accordingly, supply and discharge of water to and from the water storage tank 12 is possible with a simple structure, merely by incorporating the toggle switch 24, without increasing the number of float switches or using a complicated control program adapted to the respective modes.

In addition, an existing water pump 14 control apparatus adapted solely for either water discharge or water supply, for example, can be reconfigured into an apparatus capable of both water discharge and water supply merely by incorporating the toggle switch 24.

It should be noted that when switching from water discharge mode to water supply mode or from water supply mode to water discharge mode, the operator not only operates the switch 24a of the toggle switch 24 but also switches the connection destinations of the intake hose 30 and the delivery hose 32 as explained earlier.

As stated above, the embodiment of this invention is configured to have an apparatus (10) for controlling a water pump (14) having an engine (16) that drives an impeller (72), a water intake port (inlet pipe 26) and delivery port (outlet pipe 28), a water storage tank (12) and a hose (intake hose 30 or delivery hose 32) connected to the water intake port or the delivery port, the water pump being adapted to discharge water sucked through the water intake port from the delivery port when the impeller is driven by the engine, and to discharge water from or supply water to the water storage tank when connection of the hose switched between the intake port and delivery port by an operator, comprising: a first water level detector (first float switch 18) installed at an upper first height inside the water storage tank that outputs an A signal (ON signal) when a level of water in the water storage tank is at or higher than the first height and outputs a B signal (OFF signal) when the level of the water in the water storage tank is lower than the first height; a second water level detector (second float switch 20) installed at a lower second height inside the water storage tank that outputs the A signal when the level of the water in the water storage tank is at or lower than the second height and outputs the B signal when the level of the water in the water storage tank is higher than the second height; a connection switcher (toggle switch 24) switchably connected to the first and second water level detector to be operable by the operator that switches connection of the first and second water level detector when operated by the operator; and an impeller controller (control unit 22) connected to the connection switcher and adapted to control operation of the engine that drives the impeller of the water pump based on the signals outputted from the first and second water level detectors. With this, it becomes possible to reverse the connections between the first and second float switch 18, 20 and the control unit 22 by switching, thereby enabling discharge and supply of water from and to the water storage tank 12 with a simple structure and simple control program.

In other words, although the signals outputted from the first and second float switch 18, 20 when the impeller 72 is to be driven differ between a water discharge mode for discharging water from the water storage tank and a water supply mode for supplying water to the water storage tank, the connections between the control unit 22 and the first and second float switch 18, 20 are reversed by the toggle switch 24 when the mode is changed, so that the signals sent to the control unit 22 when the impeller 72 is to be driven are always the same irrespective of whether in water discharge mode or in water supply mode.

From this it follows that it suffices for the control unit 22 to control the driving of the impeller 72 based solely on the received signal, without consideration to whether the mode is discharge or supply, so that discharge and supply of water from and to the water storage tank 12 can be achieved with a simple structure and simple program, merely by incorporating the toggle switch 24, without increasing the number of float switches or using a complicated control program adapted to the respective modes.

In the apparatus, it is configured that the connection switcher has an input terminal a connected to the first water level detector, an input terminal b connected to the second water level detector, an output terminal c connected to the input terminal a, an output terminal d connected to the input terminal b, and switch (24a) provided to be operable by the operator, and is adapted to switch the connection of the input terminal a to the output terminal d and the connection of the input terminal b to the output terminal c when the switch is operated by the operator. With this, in addition to the foregoing effect, it becomes possible to switch (reverse) signals using a simple structure.

In the apparatus, it is configured that the impeller controller controls the operation of the engine to drive the impeller when the signal outputted from the output terminal c is the A signal and the signal outputted from the output terminal d is the B signal (control unit 22; S10, S12, S14). With this, in addition to the foregoing effect, it becomes possible to start the impeller 72 by operating the switch 24a to connect the input terminal a of the toggle switch 24 to its output terminal c and connect its input terminal b to its output terminal d, i.e., to drive the water pump 14 to start discharge of water from the water storage tank 12, when the water in the water storage tank 12 reaches a level at or higher than the first height, and to start the impeller by operating the switch 24a to connect the input terminal a of the toggle switch 24 to its output terminal d and connect its input terminal b to its output terminal c, i.e., to start the water pump 12 to start supply of water to the water storage tank 12, when the water in the water storage tank 12 reaches a level at or lower than the second height.

In the apparatus, it is configured that the impeller controller controls the operation of the engine to stop the impeller when the signal outputted from the output terminal c is the B signal and the signal outputted from the output terminal d is the A signal (control unit 22; S10, S20, S22). With this, in addition to the foregoing effect, it becomes possible to stop the impeller 72 by operating the switch 24a to connect the input terminal a of the connection switcher to its output terminal c and connect its input terminal b to its output terminal d, i.e., to stop the water pump to terminate discharge of water from the water storage tank 12, when the water in the water storage tank 12 reaches a level at or lower than the second height, and to stop the impeller by operating the switch 24a to connect the input terminal a of the connection switcher to its output terminal d and connect its input terminal b to its output terminal c, i.e., to stop the water pump to terminate supply of water to the water storage tank 12, when the water in the water storage tank 12 reaches a level at or higher than the first height.

In the apparatus, it is configured that the impeller controller controls the operation of the engine to maintain driving of the impeller when the impeller is driven and controls the operation of the engine to maintain stopping of the impeller when the impeller is stopped, if the signals outputted from the output terminals c and d are both the B signal (control unit 22; S10, S20). With this, in addition to the foregoing effect, it becomes possible to reliably perform discharge of water from the water storage tank 12 and supply of water to the water storage tank 12.

In the apparatus, it is configured that the impeller controller controls the operation of the engine to stop the impeller when the signals outputted from the output terminals c and d are both the A signal (control unit 22; S10, S12, S16). With this, in addition to the foregoing effect, it becomes possible to avoid malfunction or the like of the apparatus by stopping the impeller 72, because when the signals from the output terminals c and d are both the A signal, it is likely that some abnormality has occurred, most likely in the first or second float switch 18, 20.

In the apparatus, it is configured that the impeller controller issues a warning to the operator when the signals outputted from the output terminals c and d are both the A signal (control unit 22; S10, S12, S18). With this, in addition to the foregoing effect, it becomes possible to notify the operator of a probable abnormality, because when the signals from the output terminals c and d are both the A signal, it is likely that some abnormality has occurred, most likely in the first or second water level detector.

In the apparatus, it is configured that the first and second water level detectors are constituted as float switches. With this, it becomes possible to simply detect water level.

Although the water pump 14 was designated as a centrifugal pump in the foregoing, another type of pump can be used instead.

The control unit 22 is configured to start the water pump 14 when the signal from the output terminal c is an ON signal and the signal from the output terminal d is an OFF signal and to stop the water pump 14 when the signal from the output terminal c is an OFF signal and the signal from the output terminal d is an ON signal, but oppositely for this, it is also possible to start the water pump 14 when the signal from the output terminal c is an OFF signal and the signal from the output terminal d is an ON signal and stop the water pump 14 when the signal from the output terminal c is an ON signal and the signal from the output terminal d is an OFF signal.

Although a float switch type level sensor is used as the device for detecting water level in the water storage tank 12, another type of water level detector can be used instead.

Japanese Patent Application No. 2014-067788, filed on Mar. 28, 2014, is incorporated by reference herein in its entirety.

While the invention has thus been shown and described with reference to a specific embodiment, it should be noted that the invention is in no way limited to the details of the described arrangements; changes and modifications may be made without departing from the scope of the appended claims.

What is claimed is:

1. An apparatus for controlling a water pump having an engine that drives an impeller, a water intake port and delivery port, a water storage tank and a hose connected to the water intake port or the delivery port, the water pump being adapted to discharge water sucked through the water intake port from the delivery port when the impeller is driven by the engine, and to discharge water from or supply water to the water storage tank when connection of the hose switched between the intake port and delivery port by an operator, comprising:

a first water level detector installed at an upper first height inside the water storage tank that outputs an A signal when a level of water in the water storage tank is at or higher than the first height and outputs a B signal when the level of the water in the water storage tank is lower than the first height;

a second water level detector installed at a lower second height inside the water storage tank that outputs the A signal same as the A signal outputted from the first water level detector when the level of the water in the water storage tank is at or lower than the second height and outputs the B signal same as the B signal outputted from the first water level detector when the level of the water in the water storage tank is higher than the second height;

an impeller controller adapted to control operation of the engine that drives the impeller of the water pump based on the signals outputted from the first and second water level detectors; and a connection switcher interposed between the first and second water level detectors and the impeller controller to switch connection state between the first and second water level detectors and the impeller controller, wherein the connection switcher has:
- an input terminal a connected to the first water level detector;
- an input terminal b connected to the second water level detector;
- an output terminal c connected to the impeller controller;
- an output terminal d connected to the impeller controller; and
- a switch provided to be operable by the operator, wherein the connection switcher switches the connection state between:
- a first connection state in which the input terminal a is connected to the output terminal c, and the input terminal b is connected to the output terminal d; and
- a second connection state in which the input terminal a is connected to the output terminal d, and the input terminal b is connected to the output terminal c, when the switch is operated by the operator, wherein the impeller controller controls operation of the engine solely based on the signals outputted from the output terminals c and d, irrespective of how the connection switcher is switched and without checking whether in water discharge mode or in water supply mode.

2. The apparatus according to claim 1, wherein the impeller controller controls the operation of the engine to drive the impeller when the signal outputted from the output terminal c is the A signal and the signal outputted from the output terminal d is the B signal.

3. The apparatus according to claim 1, wherein the impeller controller controls the operation of the engine to stop the impeller when the signal outputted from the output terminal c is the B signal and the signal outputted from the output terminal d is the A signal.

4. The apparatus according to claim 1, wherein the impeller controller controls the operation of the engine to maintain driving of the impeller when the impeller is driven and controls the operation of the engine to maintain stopping of the impeller when the impeller is stopped, if the signals outputted from the output terminals c and d are both the B signal.

5. The apparatus according to claim 1, wherein the impeller controller controls the operation of the engine to stop the impeller when the signals outputted from the output terminals c and d are both the A signal.

6. The apparatus according to claim 1, wherein the impeller controller issues a warning to the operator when the signals outputted from the output terminals c and d are both the A signal.

7. The apparatus according to claim 1, wherein the first and second water level detectors are constituted as float switches.

* * * * *